Nov. 13, 1951  V. CLARK  2,575,248
FISH LURE
Filed Oct. 28, 1946

INVENTOR.
VERDELLE CLARK
ATTORNEY

Patented Nov. 13, 1951

2,575,248

UNITED STATES PATENT OFFICE 2,575,248

FISH LURE

Verdelle Clark, Presque Isle, Maine

Application October 28, 1946, Serial No. 706,275

1 Claim. (Cl. 43—42.25)

This invention relates to the art of fishing, including devices employed in the catching of fish, and particularly to a fish lure of the fly-hook type.

In an effort to catch fish, lures of various kinds have been employed with varying degrees of success. Devices previously in use have been ineffective, lacking in durability, or otherwise not completely satisfactory.

It is an object of the invention to provide an effective and serviceable lure including a casting fly having eye spots to increase the effectiveness of the lure.

A further object of the invention is to provide a "spot-eyed" lure in the form of a tandem-streamer for both trolling and casting.

Another object of the invention is to provide an effective, simple and inexpensive method of producing a "spot-eyed" fish lure of the above character.

Figure 1:
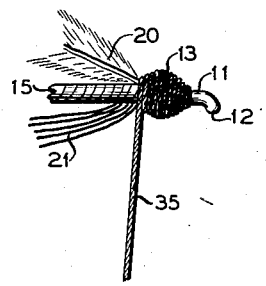
Figure 2:
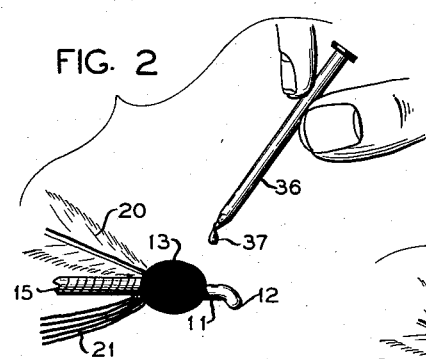
Figure 3:
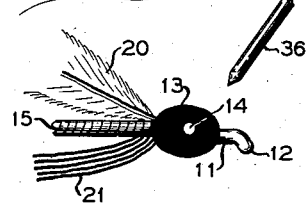
Figure 4:
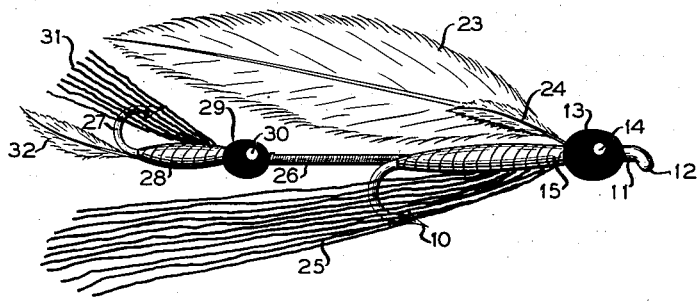

Further objects and advantages of my invention will be apparent from the following specification taken in conjunction with the accompanying drawings, wherein:

Figs. 1, 2 and 3 are fragmentary side elevations illustrating one embodiment of the invention and the progressive steps in the manufacture thereof;

Fig. 4, a side elevation of a modification embodying two hooks; and

Figure 5:
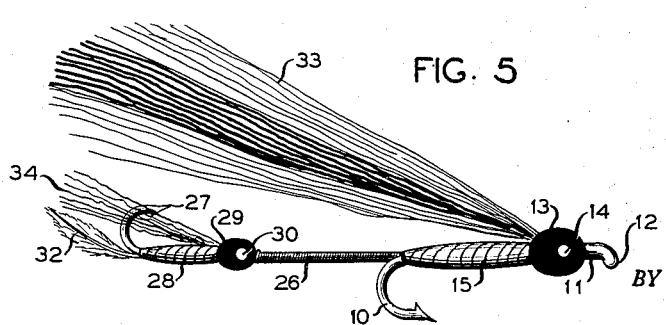

Fig. 5, a side elevation of a further modification embodying two hooks and a different arrangement of streamer camouflage means.

Briefly stated the invention comprises a lure including a head portion with a spot or spots thereon to represent the eye of an insect, or other form of fish food which the lure is intended to simulate, with a hook extending from said head and a means for concealing or camouflaging the hook, which means may simulate the wings and other parts of the insect. It has been found advantageous to employ the eye spots to improve the visibility of the lure both to the fisherman and fish and this function is particularly effective under different water conditions in which visibility is at a minimum. The eye spots also serve a further functon in lessening the percentage of short strikes in that the attention of the fish is directed to the head of the lure instead of the tail and thus the fish is induced to strike at the head, in which case the trailing hook is almost certain to be effective. In the prior devices which did not employ eye spots, fish have shown a tendency to strike at the wake or white water immediately behind the lure and thus miss the hook entirely.

Referring to the drawings, there is illustrated in Figs. 4 and 5 various forms which the fish lure of this invention may take. These various forms are designed to simulate different types of insect life which normally provide food for the type of fish designed to be caught by this lure and further the design of the lure of this invention is such that its motion immediately above or upon the surface of the water also simulates the movement of insects and attracts the attention of the fish, causing them to attempt to catch the lure, which they believe to be an insect.

In Figs. 1, 2 and 3 there is disclosed a fragmentary portion of a fishing lure comprising a shank 11 which terminates in an eye 12 at the leading end thereof. The eye 12 is designed to be attached to a fish line or leader as the case may be. On the shank 11 there is provided a head 13 having eye spots 14 thereon and the remainder of the shank is covered with a winding or wrapping 15 to conceal the shank, simulate the body of an insect and render the lure sufficiently buoyant to float on the surface of the water. Secured to the head 13 is means 20 simulating the wings of an insect, which means may be formed of light weight buoyant material such as tufting or filamentous material in the nature of strands of hair. This means 20 extends rearwardly from head 13 and may be dyed with varying colors as desired so that when viewed from below a lifelike representation of insect wings is provided. A hook camouflaging or concealing means 21 is secured to the head 13 and extends downwardly and rearwardly.

Figs. 4 and 5 illustrate still further forms which the lure of this invention may take and in these modifications two hooks are employed, one behind the other and means is provided thereon to simulate still further varieties of insects or other objects attractive to a fish.

In the modification shown in Figure 4 there is shown a fish lure comprising a first hook 10 having a shank 11 with a barb at one end thereof and means 12 for attaching a line or a leader to the other end. A second hook 27 having a shank 26 is connected to the shank 11 by welding, winding 15 or any other suitable means. A first winding on each hook designated by 15 and 28 respectively extends from the barb end of its hook toward the leading end and terminates short of the leading end of the corresponding shank. Second windings 13 and 29 respectively extending from the leading ends of the corresponding first windings are wrapped around the shank to form enlarged head portions. Elements 14 and 30 simulating eyes are provided on each of the second windings, and a transparent coating on the windings over the eyes give the eyes an appearance of depth. Means constituting wing simulating devices extend from the leading ends of the first windings upwardly and rearwardly toward and over the barb of the second hook 27. The wing simulating device 31 is in substantial curved alignment with one edge of the wing simulating device 23 of the first hook thereby giving an appearance in plan view of a single bug with continuous upper wings and in side view an appearance of two bugs with each bug having independent wings.

Fig. 5 illustrates a variation of the lure shown in Fig. 4 in which the forward hook 10 and head 13 are provided with wing simulating means 33 extending upwardly and rearwardly therefrom the rear hook 27 and head 29 also being provided with wing simulating means 34 extending upwardly and rearwardly therefrom. This modification is merely intended to represent a further form of life attractive to a fish.

This invention also contemplates a novel method or process of manufacturing the fish lure described above and this process is illustrated in Figs. 1 to 3.

The shank 11 of the hook is first covered with a winding or wrapping 15 to the desired length and configuration to represent the body of an insect and to provide buoyancy for the lure, which wrapping may be in the form of silk thread, narrow tape or the like. The head 13 is next formed on the shank 11 by winding silk thread 35 thereon to obtain a head of the desired size and configuration. After completion of the head the end of the thread 35 is secured in place by any convenient method, such as an adhesive or by tying. The head 13 is then coated with two or more coats of lacquer or Celluloid enamel of the desired color, allowing each coat to dry before applying the next coat, the lacquer or enamel shrinking the winding tightly in place and forming a hard smooth surface thereon.

Prior to the formation of the head 13, the wing means or feather 20 and camouflage means 21 are lightly secured to the shank 11 by an adhesive or the like, and by winding the thread 35 thereover in forming the head 13 the feather 20 and camouflage means 21 are effectively secured to the hook and cannot be separated therefrom except by breakage or wear.

The spot eyes 14 are applied to the head by dipping a pencil or nail 36 in enamel of the desired color so that a small drop 37 is formed on the end thereof. The drop 37 is applied to the head 13 at the desired location and allowed to dry.

The final step in completing the lure of this invention is the application of one or more coats of clear water-proof spar varnish to the head 13, which results in a smooth hard light reflecting surface and in conjunction with the eye spots 14 gives an appearance of depth and life-like quality to the head, which appears to a fish as that of an insect.

It is thus seen that there is provided by this invention a novel fish lure which is both effective and durable and which can be simply and economically manufactured by the novel method described herein and that the lure may be formed to represent or simulate any desired insect or combination of insects, or in some instances a small fish moving through the water, or small fish chasing or pursuing an insect slightly above the surface of the water.

There is also provided by this invention the novel tandem hook arrangement described in connection with Figs. 4 and 5 in which one hook is designed to catch a fish by the lower jaw and the other hook by the upper jaw, this arrangement having proved very satisfactory in view of the fact that during certain seasons of the year the lower jaw of a fish becomes very tough and consequently the downwardly extending hook might not imbed itself therein and so the chances of catching the fish are greatly enhanced by also providing an upwardly extending hook.

It will be obvious to those skilled in the art that various changes may be made in the invention without departing from the spirit and scope thereof and therefore the invention is not limited by that which is shown in the drawings and described in the specification but only as indicated in the appended claim.

What is claimed is:

A fish lure comprising a first hook having a shank with a barb at one end thereof and means for attaching a line to the other end thereof, a second hook having its shank arranged substantially in alignment with and connected to the shank of the first hook and having a barb at its free end extending in an opposite direction from the barb of the first hook, a first winding on each hook extending from the barb end thereof toward the leading end and terminating short of the leading end of the shank thereof, a second winding extending from the leading end of each of said first windings and wrapped around the shank to form an enlarged head, elements simulating eyes provided on each of said second windings and coatings on said second windings over said eyes, said coatings over said eyes being transparent whereby the eyes have the appearance of depth, and means extending from the leading end of the first windings of each hook rearwardly toward and over the barb end of the second hook whereby the barb of the second hook is only partially visible, said means constituting a wing simulating device having widely spaced edges, said wing simulating device of said second hook extending upwardly and rearwardly from its leading end over the barb of said second hook and having its outer end in substantial curved alignment with one edge of the wing simulating device of the first hook whereby in plan view the lure has the appearance of a single bug with continuous upper wings and in side view the appearance of two bugs, each bug having independent wings.

VERDELLE CLARK.

REFERENCES CITED

The following references are of record in the file of this patent:

UNITED STATES PATENTS

| Number | Name | Date |
| --- | --- | --- |
| 1,486,581 | Hewitt | Mar. 11, 1924 |
| 1,557,083 | Peckinpaugh | Oct. 13, 1925 |
| 1,592,600 | Hickman | July 13, 1926 |
| 1,657,734 | Wright et al. | Jan. 31, 1928 |
| 1,734,346 | Rienhardt | Nov. 5, 1929 |
| 1,929,151 | Peckinpaugh | Oct. 3, 1933 |
| 1,949,582 | Pott | Mar. 6, 1934 |
| 1,995,985 | Jennings | Mar. 26, 1935 |
| 2,018,622 | Davenport | Oct. 22, 1935 |
| 2,034,832 | Raycraft | Mar. 24, 1936 |
| 2,134,401 | Harvey | Oct. 25, 1938 |
| 2,148,799 | Bilinski | Feb. 28, 1939 |

FOREIGN PATENTS

| Number | Country | Date |
| --- | --- | --- |
| 220,814 | Great Britain | Aug. 28, 1924 |